(12) United States Patent
Wilson et al.

(10) Patent No.: US 6,697,180 B1
(45) Date of Patent: Feb. 24, 2004

(54) ROTATION CORRELATION MULTIPLEX HOLOGRAPHY

(75) Inventors: William L. Wilson, Longmont, CO (US); Kevin R. Curtis, Longmont, CO (US); Michael C. Tackitt, Lyons, CO (US)

(73) Assignee: Inphase Technologies, Inc., Longmont, CO (US)

( * ) Notice: Subject to any disclaimer, the term of this patent is extended or adjusted under 35 U.S.C. 154(b) by 0 days.

(21) Appl. No.: 10/215,868

(22) Filed: Aug. 9, 2002

(51) Int. Cl.[7] .................................................. G03H 1/12
(52) U.S. Cl. ............................ 359/11; 359/10; 359/22; 359/24; 365/125
(58) Field of Search .............................. 359/10, 11, 22, 359/24, 25, 35; 365/125, 216, 234; 369/103

(56) References Cited

U.S. PATENT DOCUMENTS

| | | | | |
|---|---|---|---|---|
| 5,477,347 A | * | 12/1995 | Redfield | 359/3 |
| 5,627,664 A | * | 5/1997 | Trisnadi | 359/11 |
| 5,638,193 A | * | 6/1997 | Trisnadi | 359/11 |
| 5,719,691 A | * | 2/1998 | Curtis | 359/11 |
| 5,874,187 A | * | 2/1999 | Colvin | 430/2 |
| 5,943,145 A | * | 8/1999 | Curtis | 359/22 |
| 6,191,875 B1 | | 2/2001 | Curtis et al. | |

* cited by examiner

Primary Examiner—Drew Dunn
Assistant Examiner—Leo Boutsikaris
(74) Attorney, Agent, or Firm—Morrison & Foerster/LLP (57) ABSTRACT

Holography in which an array of overlapping holograms is recorded or reconstructed in a recording medium, holograms being produced by interference of a reference beam and a signal beam, in which the reference beam is a phase beam which consists essentially of a multitude of rays of varying angle of incidence and non-uniform phase, in which the process comprises changing the orientation of the phase beam for recording or reconstructing different holograms, wherein phase beam orientation is changed relative to the medium while maintaining the medium stationary in order to enable recording or reconstruction of individual holograms at a given location of the medium.

26 Claims, 6 Drawing Sheets

ROTATION CORRELATION MULTIPLEX HOLOGRAPHY

BACKGROUND OF THE INVENTION

1. Field of the Invention

The invention relates to holographic storage, in particular to holographic storage processes such as phase correlation multiplexing.

2. Description of the Related Art

Holography involve s a process by which an image is stored as an interference pattern formed in a storage medium by the interference between a signal beam representing the image and a reference beam, and conversely, holography involves the process by which images are reconstructed from such interference patterns.

More specifically, holographic memory systems involve the three-dimensional storage of holographic representations (i.e., holograms) of data elements as a pattern of varying refractive index and/or absorption imprinted into the volume of a storage medium. Holographic memory systems are characterized by their high density storage potential and the potential speed with which the stored data is randomly accessed and transferred.

In general, holographic storage memory systems operate by combining a data-encoded object beam with a reference beam to create an interference pattern in a photosensitive storage medium. (See, e.g., *Holographic Data Storage*, by H. J. Coufal, D. Psaltis, G. T. Sincerbox (Editors), Springer-Verlag, New York, 2000, P.3–59, which is hereby incorporated by reference.) The interference pattern induces material alternations in the medium that create a hologram. The formation of the hologram in the storage medium is a function of the relative amplitudes and polarization states of, and phase differences between, the object beam and the reference beam. It is also highly dependent on the incident beams' wavelengths and the angles at which the object beam and the reference beam are projected into the storage medium.

Holographically stored data is reconstructed by projecting into the medium a reference beam at the same angle, wavelength, phase, and position as the reference beam used to produce the hologram. The hologram and the reference beam interact to reconstruct the stored object beam. The reconstructed object beam then is detected, e.g., using a photodetector array, and the recovered data is post-processed for delivery to output devices.

Typically, the dynamic range of the holographic storage medium is larger than what is needed to store a single hologram with an acceptable signal-to-noise ratio. Therefore, it is often desirable to multiplex a number of holograms at one location to attain greater storage density. One technique for multiplexing is phase correlation multiplexing, as discussed in U.S. Pat. No. 5,719,691, the disclosure of which is hereby incorporated by reference. In phase correlation multiplexing, correlation is used to differentiate overlapping holograms within a medium. Correlation selectivity relies on the differences in amplitude, phase, and angle content of the reference beam generated by the relative shift of the storage medium with respect to the reference beam.

Basically, correlation multiplexing involves the storage of multiple holograms in an overlapping fashion. These holograms can be individually accessed through small translations of the storage medium relative to an object beam and a reference beam. The reference beam is spatially modulated with hologram position information. This highly complex reference beam relies on the phase, amplitude and angle differences induced by translating the medium relative to the complex reference for selectivity. A stored pattern of a single hologram can be recovered when the read-out reference beam is centered on the stored image to an accuracy determined by the by the correlation function of the reference beam (which in practice can be as short as a few microns).

Phase distance multiplex holography is described in U.S. Pat. No. 5,943,145, the disclosure of which is hereby incorporated by reference. In phase distance multiplexing, selection among multiple overlapping holograms within a medium is achieved by changing the distance between the medium and a phase mask used to impart phase content to a reference beam. It involves relative movement of the medium and the reference beam.

The use of a reference beam having correlated phase content during correlation multiplexing is disclosed in U.S. Pat. No. 6,191,875, the disclosure of which is hereby incorporated by this reference. It was found that reference beams having random phase content limited the attainable storage density and signal to noise ratio, (SNR) for stored holograms due to uncontrolled fluctuations in the correlation selectivity. A reference beam having correlated phase content provides higher SNR and the ability to tailor the reference beam spectrum to minimize cross talk between neighboring holograms.

A practical consideration in commercial holographic storage devices is simplification of the movements used in accessing individual holograms in an array of overlapping holograms. For instance, in one system in which the holographic storage medium has a disk format, accessing a stack of holograms involves sliding at least a portion of a lens system to different radial positions above the disk. Once the lens system portion is in a given radial location, a holographic storage location associated with the given radial location can be accessed for recording an image as a hologram at the location or for reconstructing an image previously recorded as a hologram at the location. A particular problem in a phase correlation multiplexing system is to simplify the small movements required to change the reference beam phase structure sufficiently to access different overlapping holograms. For example, a movement of 30 microns with 1/10-micron accuracy may be required to access successive overlapping holograms. In general, the more massive the object to be moved, the more difficult it can be to achieve such small high precision movements.

Thus, there has been a need for improvements that simplify the movements required to change a reference beam structure so as to access different overlapping holograms located in about the same location of a storage medium. The present invention meets that need.

SUMMARY OF THE INVENTION

One aspect of the present invention involves rotation correlation multiplex (RCM) holography in which an array of overlapping holograms can be recorded or can be reconstructed in a holographic storage medium. The holograms are produced by interference of a reference beam and a signal beam in which the reference beam is a phase beam, which consists essentially of a multitude of rays of varying angle of incidence and non-uniform phase. Holography in accordance with the invention involves changing the orientation of a complex phase beam relative to the medium. In one embodiment, changing the orientation of the complex phase beam involves rotation of a phase mask so that the structure of the phase beam incident on the medium is changed sufficiently to select one of many different holograms stored at a given medium location.

BRIEF DESCRIPTION OF THE DRAWINGS

FIGS. 3A–B are illustrative drawings of earlier hologram layouts.

TERMINOLOGY

Disclosure is facilitated by use of a terminology convention. Certain terms are adopted from shift holography (in which first order Bragg selectivity is required for differentiating overlapping holograms in the shift direction). While useful for description and comparison, these terms do not imply the limitations of the earlier process. As a prime example, since Bragg selectivity is not used, there is no relationship between direction and packing density.

Correlation function—The similarity function indicating traversal distance necessary for meaningful change in the amount of overlap of the concerned function. See, *Sov. J Quant. Electron*, vol. 7, no. 8, pp. 961–964, August 1977, describing the function as applied to a phase mask.

A correlation function represents the similarity of a function to the shifted complex conjugate of a second function. If the functions are identical, the correlation is called an auto-correlation function. The value of the auto-correlation at position (0,0), perfectly overlapped, is a maximum. The value at this position is equal to the total energy of the function. As the functions are shifted with respect to each other, the value of the function at this position will be smaller because of the resulting decrease in overlap. For a random phase mask, the auto-correlation function is sharply-peaked—with width of the peak on the order of the size of a pixel. Most effective operation results by use of a common form of commercially-available random mask in which the average delay for the entire mask is numerically equal to zero. This corresponds with a binary phase mask in which 50% of the cross section is of each of the two binary values, which are symmetric about zero. The same condition is attained for a mask of random rather than binary values, providing the array of pixels is "white"—a condition realized for truly random, multi-wavelength, scratch depth. In terms of the function, the height-to-floor ratio of the peak is large—shifting the mask by a pixel width results in an effective area of overlap which approaches zero; for such a mask.

Phase Beam—Characterizing the reference beam as incident on the holographic medium, constituting a beam containing many rays of varying angles of incidence and of non-uniform phase content to result in an auto-correlation function adequate for needed selectivity. The term is intended to include beams of deterministic ray and phase content.

Phase-Ordered Beam—Differentiated from a phase beam, a beam primarily consisting of a single ray or of rays of continuously varying angle. e.g., a plane wave, or a converging or diverging beam. Its auto-correlation function is substantially equal to its cross-sectional area. A phase-ordered beam is not suitable for the invention.

Phase Mask—Mask which, as illuminated by a phase-ordered beam, yields a phase beam. The term includes conventional phase masks and/or scatter masks containing a prescribed ordered array of random or deterministic pixels of constant or varying phase delay. The term includes ground glass which is exemplary of masks containing a random array, which while functional, may hinder some contemplated uses.

Holographic Medium (or "Medium")—The actinic material within which the hologram is recorded. It may take a variety of forms, such as, e.g., a film containing dispersed silver halide particles, an acrylate-based photopolymer, or a free-standing $LiNbO_3$ crystal.

Random—Non-prescribed order, defining a sequence which does not repeat over a substantial fraction of the field. The term is descriptive of pixels within a phase mask or of rays within a beam.

Thin Medium—Recording medium of less than 1 mm—as distinguished from "thick media" greater than 1 mm. (The designation is a formal one based primarily on available product. It does not have the significance of media used for multiplexing based on Bragg selection.)

Overlapping—Refers to multiple holograms with at least regions of differing holograms occupying the same volume of recording medium. The term is intended to include the usual consequence of in-plane multiplexing in which the overlapping holograms are not restricted to the identical volume, as well as a contemplated variant of distance multiplexing in which overlapping holograms, as recorded, are restricted to the identical volume.

DETAILED DESCRIPTION OF THE PREFERRED EMBODIMENTS

General—Phase correlation holography functions as a truly two-dimensional (2D) holographic multiplexing process. Preferred embodiments may or may not use a medium which is sufficiently thin to preclude Bragg selectivity for differentiation of successive holograms. It has many valuable attributes, and will likely become the long-sought practical digital recording process.

Selection is now entirely based on the content of the reference beam—on inclusion of rays of differing angle of incidence and non-uniform phase. Adequacy is measurable in terms of the auto-correlation function of the phase mask or of the corresponding function for the beam. A first consequence is to make selection independent of direction in the place of the medium—selectivity in y- and x-directions, or in intermediate directions, can be made identical in the absence of limitations imposed by the medium or by processing conditions. Selection also can be improved in a thick medium by combining Phase Correlation Selectivity with Bragg selectivity inherent in a thicker medium.

Figure 1:
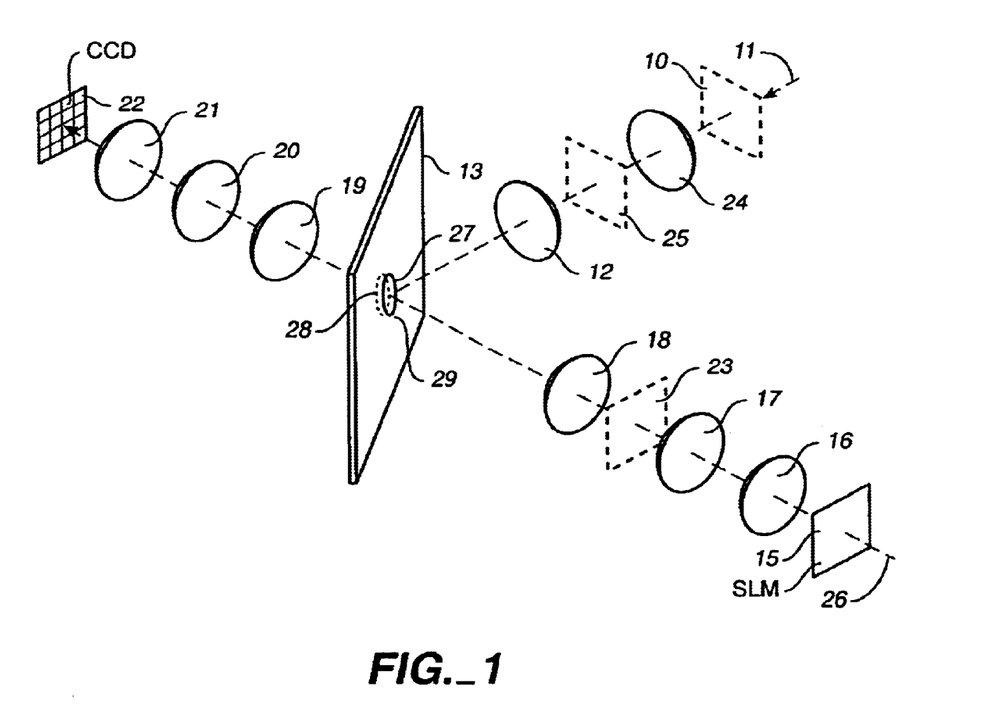
FIG. 1 is an illustrative drawing of an embodiment of a holography apparatus used in the Example.

The System—General discussion is aided by reference to FIG. 1. Elements shown in phantom indicate alternatives and enable discussion of system variations. Both versions of FIG. 1 use an illuminating beam 11, which is converted into a phase beam by a phase mask. In the Example, use of the single lens 12, with the mask positioned on plane 10, produced a image 27 of the mask on the medium. The phase mask is rotatable to access different holograms that are angularly separated from one another in a given location of a storage medium. The phase mask used was a random binary phase mask and had a pixel pitch of 20 μm, was of approximate overall dimensions, 2 cm×2 cm (1024×1024 pixels). Half of the randomly located pixels imposed a phase-shift of 180°, so that changing phase across the beam front averaged at zero. The signal beam 26 is modulated by "spatial light modulation" 15 producing a signal pattern from a computer not shown.

The experimental arrangement shown process for signal introduction through lenses 16, 17 and 18, and for readout by means of lenses 19, 20 and 21. With lenses in standard 4F configuration, a Fourier transform hologram 27 is recorded on medium 13, and is reconstructed to produce an image on detector 22. 4F configuration requires focal distance spacings so that object-to-lens 16 spacing is equal to the focal distance of lens 16, $F_{16}$, lens 21-to-detector spacing is equal to the focal distance $F_{21}$, and lens to lens spacing are the sum of focal distances, i.e., $F_{16}+F_{17}$ for the distance between lenses 16 and 17.

The specifics of the arrangement are only illustrative. 4F optics are not required—relay optics are acceptable. Spatial filtering may be done between lenses, in the lens series 19–21, to improve SNR. The phase mask need not be located at either the focal plane nor the focus of lens 12, nor is it required that medium 13 be located at the other focal plane. Lens 24, shown in phantom, illustrates an alternative arrangement providing for imaging the mask, now located at place 10, onto the medium. It is not required that beam 11 be a plane wave—e.g., a spherical beam can be substituted. Selectivity is not very sensitive to the exact position of the phase mask, but it is required that the position be the same during reconstruction. Omission of lenses in the reference beam results in some loss in selectivity which may be tolerable.

The apparatus shown is otherwise illustrative only. Arrangement for Fourier transform holography storage is only one option. For example, with successive elements still located on Fourier planes, omission of one lens in each of the 16–18 and 19–21 lens series results in an image hologram and continues to provide for image reconstruction. A phase mask in contact with SLM 15 or at plane image plane 23 assures uniform brightness of the signal beam for better recording. In addition, the signal beam may be filtered to eliminate higher-order diffraction modes or miscellaneous noise.

For thick media—for media>1 mm—best results have been obtained for imaging of the phase mask on the recording medium. For thick media, it has been found useful to filter out zeroth order diffracted waves by use of a blocking filter of Fourier plane 25 in the reference beam. Such a DC filter, consisting of a central blocking region, may in addition have horizontal and vertical lines crossing at this region, so as to additionally block x- and y-components.

For thin media, the Fourier plane filter may not be necessary but is still desirable. While a Fourier transform of the phase mask could be nearly as effective as a mask image, use of a spatial filter with a transform, rather than an image, may result in some increase in SNR. Filtering is desirably on the plane of the phase mask.

Figure 2:
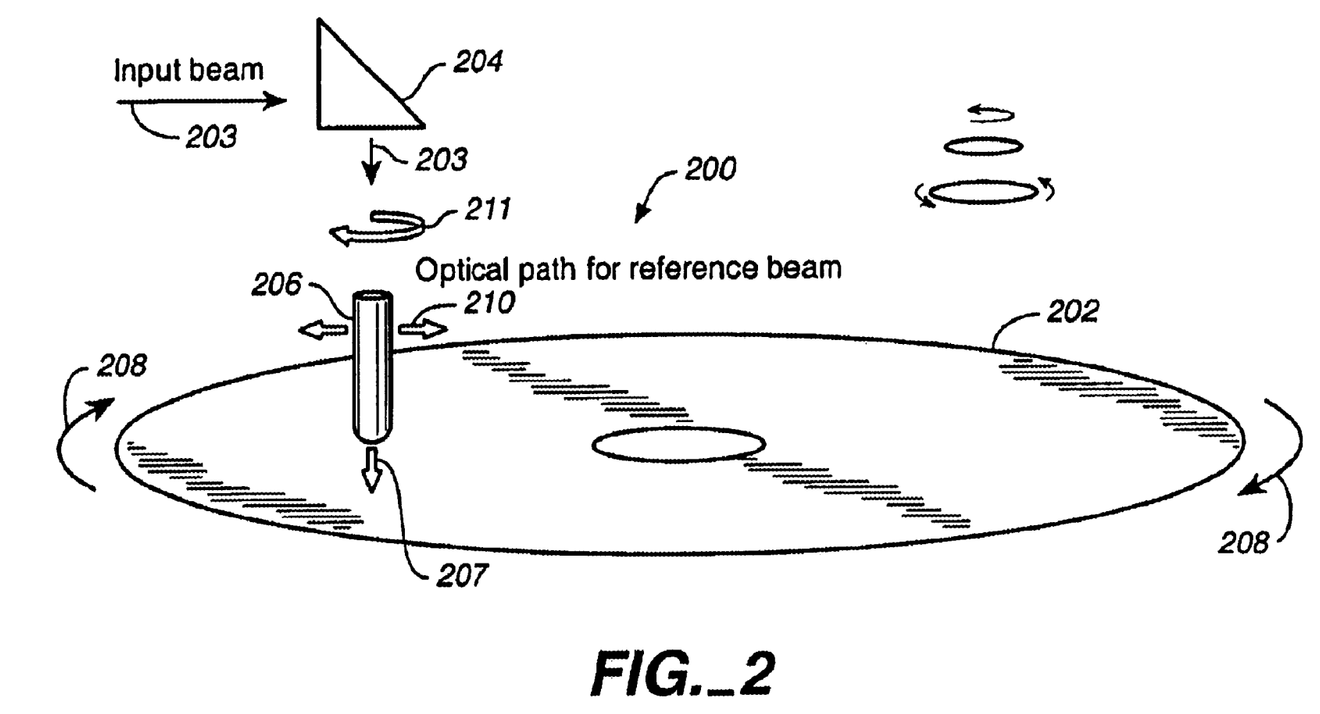
FIG. 2 is an illustrative more simplified drawing of the embodiment of the holography apparatus used in the Example in which the medium has a disk format and in which at least a portion of the optics are operable to steer a reference phase beam radially along the disk-shaped medium so as to illuminate different radially spaced locations of the disk.

FIG. 2 is a simplified conceptual diagram of a portion of a holographic storage system 200 in accordance with an embodiment of the invention. The role of FIG. 2 is to highlight some of the physical movements required in one type of illustrative holographic storage system. The functionality of the embodiment of FIG. 2 will be understood by reference to the drawings and corresponding description of FIG. 1. Moreover, the drawings of FIG. 2 are simplified in order to illustrate some advantages of the invention with respect to its application with a medium 202 that has a disk shaped format. A phase-ordered reference beam 203 is provided to an optical system, represented in simplified form by wedge 204, which directs the reference beam to a phase mask 206. In order to simplify the drawing, the signal beam and corresponding signal beam optics are not shown. The phase mask 206 imparts phase content to the reference beam and outputs a phase beam 207 that illuminates a spot on the disk 202. In order to access a given stack of holograms at a given location of the disk 202, the position of the disk is changed by rotating it to an angular position corresponding to the given stack location as indicated by arrows 208. At least a portion of the lens optics 204, and perhaps the phase mask 206, are moved so as to steer the reference beam to a radial position corresponding to the given stack location. Arrows 210 indicate radial movement of the reference beam. Once the disk 204 has been moved to the desired angular position and the reference beam has been steered to the desired radial position, individual holograms in the given stack can be accessed by changing the orientation of the phase mask 206 as indicated by arrow 211.

In accordance with a present embodiment of the invention, individual holograms are accessed by rotation of the phase mask as indicated by arrow 211. Rotation of the phase mask results in a change in the orientation of the phase mask relative to the medium 202 which in turn results in a change in the reference beam structure incident on the medium at the given location selected by the disk rotation movement indicated by arrows 208 and by the beam translation movement indicated by arrow 210. During recording, simultaneously shining a signal beam and a phase beam upon a given medium location with the phase beam rotated to a given angular rotation, results in recording of a hologram at that given location. During reconstruction, shining a phase beam upon a given medium location with the phase beam rotated to a given angular orientation, results in reconstruction of a hologram associated with such angular rotation and medium location. Thus, selective access (both recording and reconstruction) of holograms can be achieved at different angular positions in the same given medium location. In the example, a set of 140 fully overlapping holograms was stored at one-degree rotation intervals in a single stack. It will be noted, however, that any rotation of the phase structure longer than the correlation length of the phase mask is sufficient for such phase rotation correlation multiplexing.

Figure 3A:
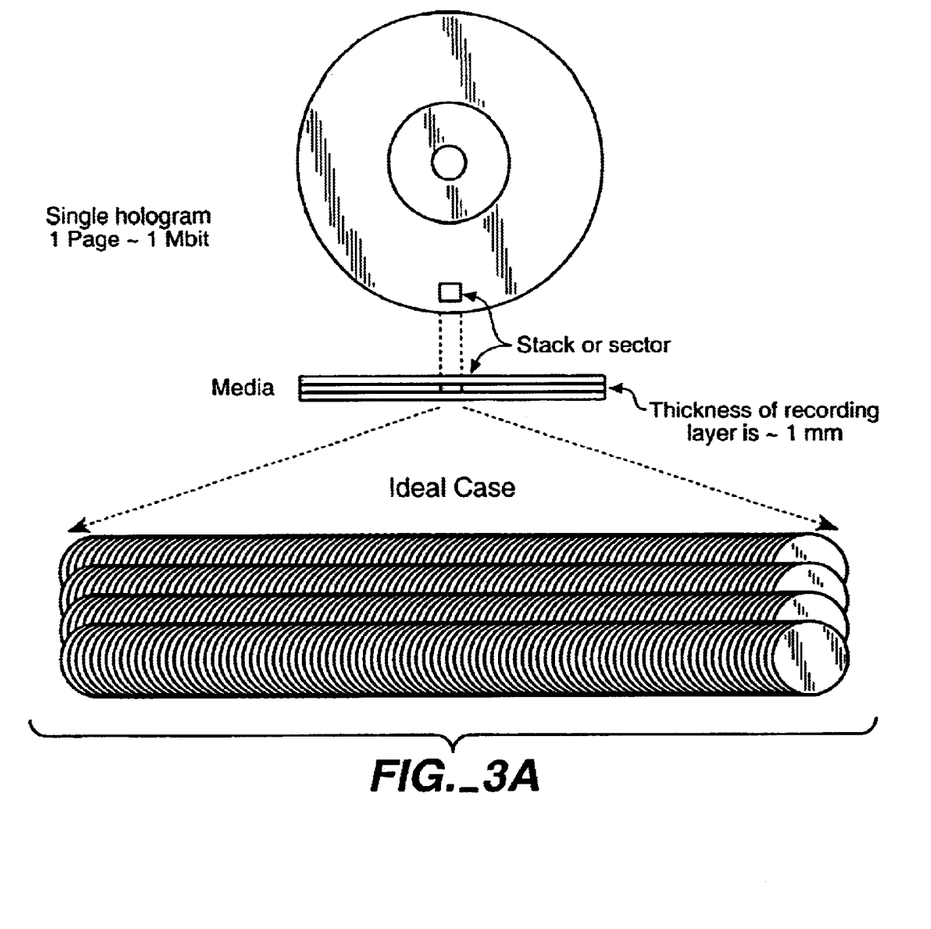
FIG. 3A shows an example of a prior continuous array of partially overlapping holograms.
Figure 3B:
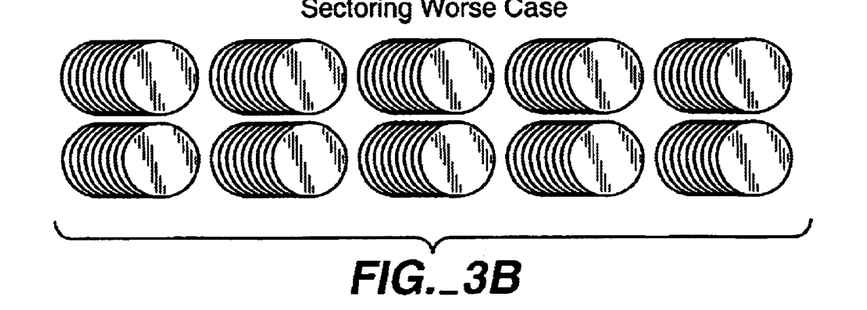
FIG. 3B shows an example of a prior discontinuous array of holograms consistent with writing relatively smaller (sectored) blocks of holograms.

An advantage of rotation correlation multiplexing is that it greatly simplifies the mechanics needed for a storage, system using a phase beam as a reference. From an engineering perspective, the ability to move to a single location and write and/or recover a large number holograms with limited motion of a small optic offers a great advantage. The illustrative drawings of FIGS. 3A–3B show prior hologram layouts in a storage medium. In FIG. 3A, holograms are partially overlapping. In FIG. 3B, groups of partially overlapping holograms are stored in spatially separated sectors. In the '145 and '691 patents it is assumed that the media when recorded would have a 2-D array of partially overlapped holograms shown in FIG. 3A. To access an individual page of data stored as shown in FIGS. 3A or 3B one would need to move a relatively large optical head, (tracking with very high precision) successively stopping at each page to be recovered.

Figure 4:
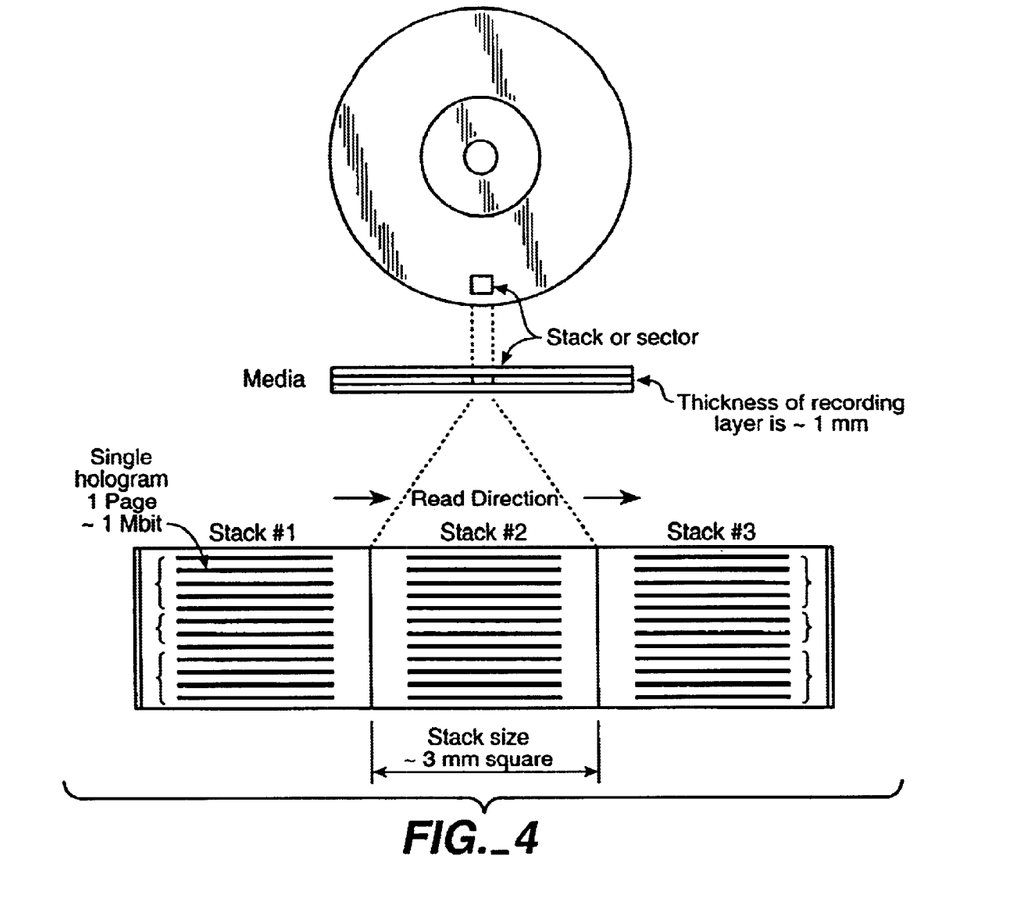
FIG. 4 is an illustrative drawing of a layout of multiple stacks of completely overlapping holograms in accordance with a present embodiment of the invention.

In contrast, FIG. 4 illustrates storage of a plurality of completely overlapping holograms using rotational selection in accordance with an embodiment of the present invention. One can array stacks of hologram s on the disk. Each stack has many overlapping holograms at the same medium location. The holograms are completely overlapping, not just partially overlapping. The motions required are first a translation from stack to stack and then accessing the pages within a stack by mask rotation. Rather, there is a high precision move from one stack to the next, but once at the new location, one can individually write or recover a large number of individual stacked holograms by rotating one relatively small optic element such as phase mask or a small optical train that is tube mounted.

An additional problem with the implementation of the '145 and '691 patents involves a sectoring penalty. With prior arrays of partially overlapping stacks as shown in FIGS. 3A–3B one typically must write large blocks of data to use the media efficiently. In contrast, the stack-wise approach afforded by RCM allows more flexibility in recording even smaller blocks of data while still using the medium efficiently. That is, with RCM, multiple holograms can be stacked in one location. Thus, there is not a great a need to write large hologram blocks of data to use the medium efficiently.

Another alternative embodiment of the invention involves a combination of correlation multiplexing plus rotation correlation multiplexing. Through such process, overlapping stacks of holograms can be created. For example, assume that 1,000 holograms are to be stored. In accordance with the embodiment of FIG. 4, all 1,000 of the hologram should be multiplexed in a completely overlapping fashion in one location using rotation correlation multiplexing. Alternatively, a combination of rotation correlation multiplexing and shift correlation multiplexing, can be used to store overlapping stacks of holograms. More particularly, for example, one can multiplex 100 holograms at one location using rotation correlation multiplex (RCM); and then shift the relative position of the reference beam relative to the medium by some fraction of a hologram dimension (e.g. 100 microns); and then again use RCM to store another 100 holograms; and then again shift the relative position by the same fraction; and store another 100 holograms using RCM, etc. Each relative position shift is by an amount that is small enough so that there is partial overlap between adjacent stacks of completely overlapping holograms. The result of this example process would be the storage of ten stacks of 100 holograms apiece in which the holograms in any given stack completely overlap with each other and in which adjacent hologram stacks partially overlap with each other.

Figure 5:
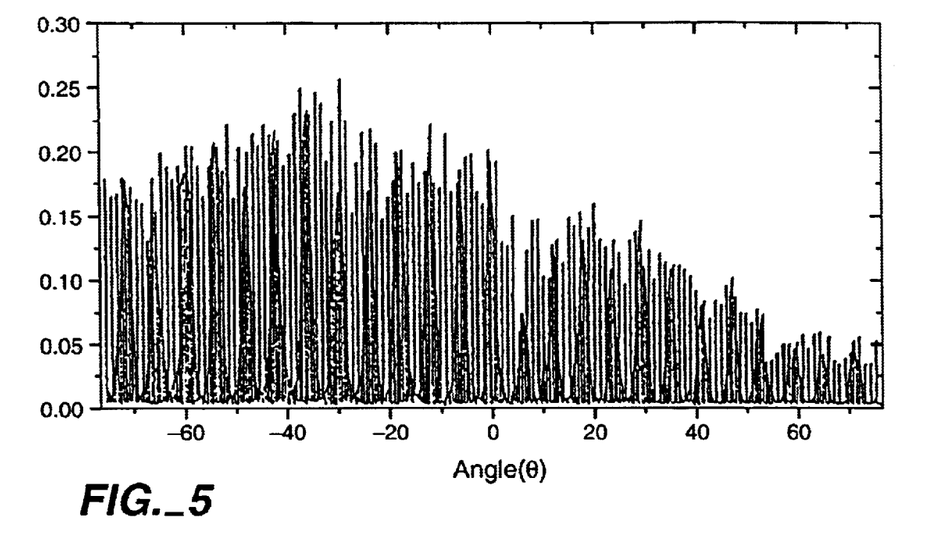
FIG. 5 is an illustrative plot showing diffracted energy versus angular rotation of the phase mask for the Example.
Figure 6:
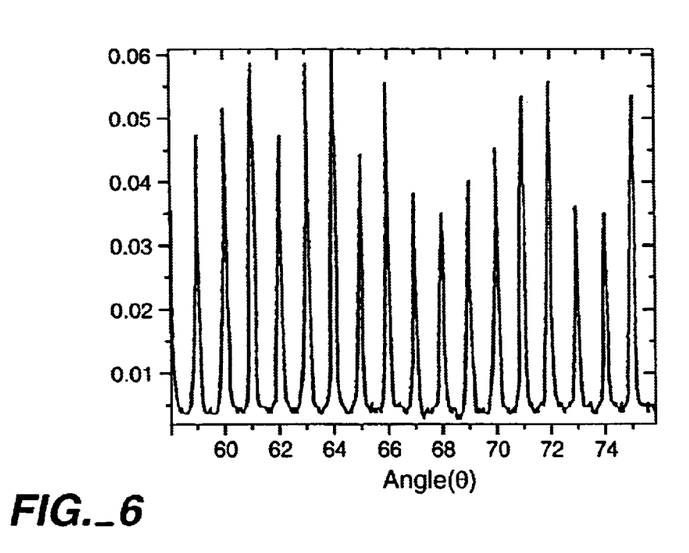
FIG. 6 is an illustrative plot of diffracted energy versus angular rotation of the phase mask of the last seventeen holograms of the example on an expanded scale.

FIG. 5 is a plot showing diffracted energy versus angular rotation of the phase mask for the example. FIG. 6 shows the plot of diffracted energy versus angular rotation of the phase mask of the last seventeen holograms of the example on an expanded scale.

The recording and reconstruction geometry may use transmissive media. For instance, *Holographic Data Storage*, pages 242–256, which is expressly incorporated herein by this reference, discloses systems for use with transmissive media. Alternatively, the recording and reconstruction geometry may use reflective media.

It will be appreciated that changing the orientation of the phase mask has the effect of changing the orientation of a reference phase beam incident upon the holographic storage medium. During recording, the phase orientation is changed to permit different individual holograms to be stored in overlapping fashion at the same given location of the medium. During reconstruction, the phase orientation is changed to permit reading of the different individual holograms that were stored previously in overlapping fashion at the same given medium location.

Figure 7:
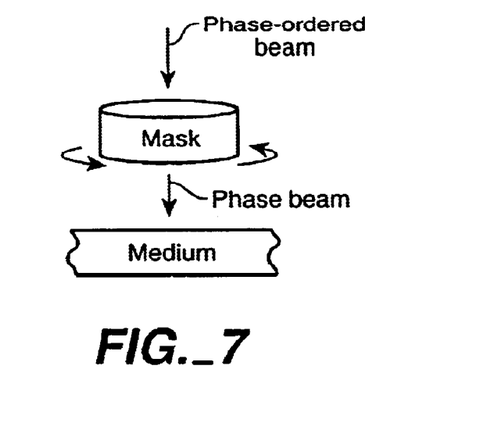
FIG. 7 is an illustrative drawing showing one embodiment of the invention in which a change in the orientation of a phase beam is achieved by rotating a phase mask about an axis parallel to phase-ordered beam.

FIG. 7 is an illustrative drawing showing one embodiment of the invention in which a change in the orientation of a phase beam is achieved by rotating a phase mask about an axis parallel to phase-ordered beam. Different individual angular orientations of the phase mask relative to the phase ordered beam result in different individual orientations of the phase beam relative to the storage medium. Different individual orientations of the phase beam relative to the storage medium can be used to access (write or read) different individual holograms at a given single location of the storage medium.

Figure 8:
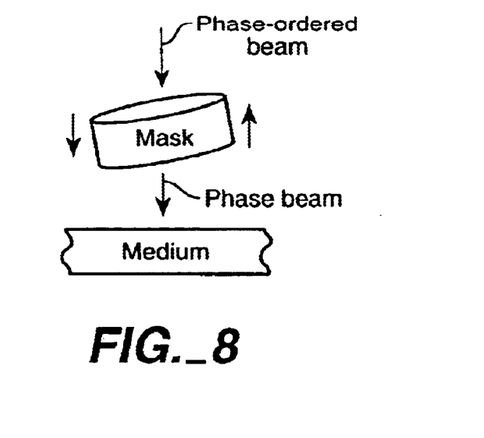
FIG. 8 is an illustrative drawing showing one embodiment of the invention in which a change in orientation of a phase beam is achieved by changing the tilt of a phase mask relative to the axis of the phase-ordered beam through a cantilever motion of the phase mask.

FIG. 8 is an illustrative drawing showing one embodiment of the invention in which a change in orientation of a phase beam can be achieved by changing the tilt of a phase mask relative to an axis of the phase-ordered beam through a cantilever motion of the phase mask. Different individual angular tilts of the phase mask relative to the phase ordered beam result in different individual orientations of the phase beam relative to the storage medium. Different individual orientations of the phase beam relative to the storage medium can be used to access (write or read) different individual holograms at a given single location of the storage medium.

Figure 9A:
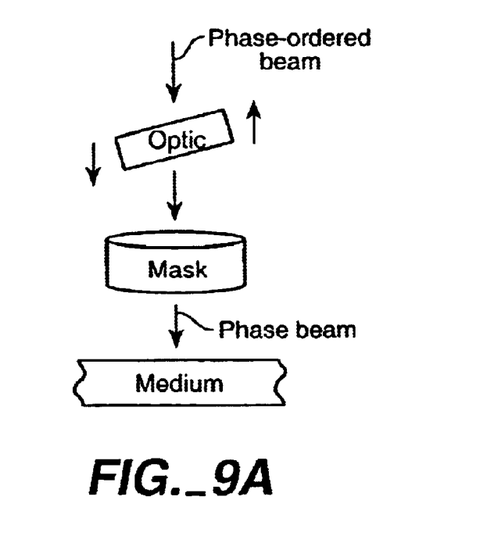
FIGS. 9A–9B are illustrative drawings of two embodiments of the invention in which a change in the orientation of a phase beam can be achieved by changing the orientation of an optic relative to the phase mask.
Figure 9B:
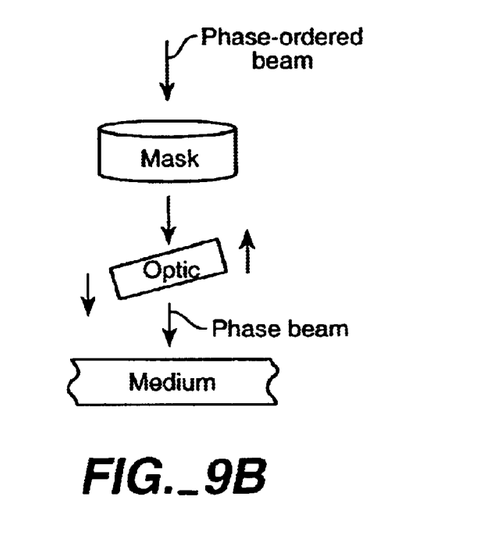

FIGS. 9A–9B are illustrative drawings of two embodiments of the invention in which a change in the orientation of a phase beam can be achieved by changing the orientation of an optic relative to the phase mask. In FIG. 9A, the optic comprises a lens positioned to direct a phase-ordered beam to the phase mask. Changing the tilt of the lens relative to the phase mask, through a cantilever motion of the lens, results in a change in the orientation of the phase-ordered beam upon the phase mask. This change in phase-ordered beam orientation results in a change in the orientation of the phase beam that emanates from the phase mask relative to the storage medium. Different individual orientations of the lens relative to the phase beam can be used to produce different individual phase beam orientations relative to the storage medium that can access (write or read) different individual holograms at a given single location of the storage medium.

In FIG. 9B, the optic comprises a lens positioned to direct a phase beam emanating from the phase mask onto the medium. Changing the tilt of the lens relative to the phase mask, through a cantilever motion of the lens, results in a change in the orientation of the phase beam upon the medium. Different individual orientations of the lens relative to the phase mask can be used to produce different individual phase beam orientations relative to the storage medium that can access (write or read) different individual holograms at a given single location of the storage medium. One could also steer a phase ordered beam or phase beam with a mirror to the same effect.

While the above embodiments employ a phase mask, a suitably complex phase can be imparted using other optical elements that impart a suitably complex phase to a beam, such as a holographic medium with a complex phase reference beam stored in it as a hologram. Alternatively a suitably phase-mismatched diode array could be employed. For instance, phase locked diode arrays have been proposed for use in holographic neural networks. See *Optoelectronics*, vol. 8, no. 1, pp. 21–34 March 1993. A series of properly directed lenslets could be employed as explained in *Optoelectronic*, vol. 8, no. 1, pages 111–123 (March 1993). Alternatively, a suitably phase mismatched array of reflecting surfaces, could be employed. For each such alternative, a change in the reference beam structure incident on the medium at the given location can be achieved through rotation of the optical element. In the case of electronically reconfigurable diode arrays and the reconfigurable arrays of reflective surfaces, effective rotation may be achieved by appropriate changes in the operative states of individual lenses or reflective surfaces. Moreover, it will be appreciated that the invention can be practiced using a reference beam having correlated phase content as described in U.S. Pat. No. 6,191,875.

Phase Beam—In the generally discussed embodiments, the phase mask is illuminated by a phase-ordered beam such as a plane wave, and only thereafter is a reference beam with proper phase and angle content produced. More generally, the requirement for the reference beam is that it contain the proper phase information when interfering with the signal beam—produced either at inception, or by modulation of a phase mask, or by a combination of the two.

Phase Mask—The nature of the phase mask is well known to the artisan. The term includes both ground glass with its very large number of small dissimilar pixels, and binary phase masks with a smaller number of nominally identical pixels, as well as intermediate phase mask structures. In all events, traversal time for radiation varies across the exit surface of the mask, to produce the changing phase delay which is the essence of the mask. For a very high level of perfection, a binary phase mask containing 20 pixels, each 1/20th of the mask area is sufficient for the invention. Expected imperfections are accommodated by a 10 pixel×10 pixel mask, and such a mask is regarded as a minimum requirement for the invention.

For the nominal phase mask in which 50% of the surface is altered from planarity, etch pits introducing a phase change of, at least 15° is operative, although a phase change of at least 45° is preferred. For minimizing noise, the average phase variation for the entire mask should be close to zero, in turn requiring a phase change of 180° in the instance of the binary phase mask. This is achieved in a conventional binary mask in which etch pits occupy 50% of the mask surface. The requirement is statistically satisfied in the most complex phase mask—in ground glass—in which widely varying pixels, most varying one from another by many wavelengths, occupy the entire surface.

The functioning characteristic of the phase mask is defined in terms of its auto-correlation functional. In inexact terms, this is a measure of the position-to-position self-similarity of the mask. The requirement, that the mask have the desired selectivity, may be measured in terms of the auto-correlation peak width—with the peak width approximately equal to the needed selectivity. This assumed correspondence is descriptive of high-quality, commercially-available phase masks. (Accordingly, one suitable commercial phase mask is a random phase mask specified by: a) wavelength; b) number of pixels; and c) pixel pitch.)

Experimentally, sufficient phase content has been introduced into a plane wave beam with a random mask constituted of pixels of a pitch (size) of 10–20 $\mu$m, with at least 100 pixels in each of the x- and y-directions in the mask. In theory not required, maximal varied pixel delay times approaching 180° lessen effects of compositional and physical non-uniformity's, and relax manufacturing specifications.

Alternative to the usual commercial random binary phase mask in which identical etch pits are randomly positioned, differing pixel-associated delay times may be associated with an ordered pixel array. Various techniques offered randomness both in position and in individual pixel characteristics (such as in ordinary ground glass). An averaged mask delay time of zero statistically assures cancellation of overlapping hologram regions and lessens noise. In other mask structures, differing delay times are due to refractive index variations.

There may be economic or other circumstances in which it is desirable to use an ordered phase mask to yield a deliberately repeated sequence over a relatively small fraction of the field this consideration may outweigh the usual objective of absolute independence of multiplexed holograms, so that some additional noise may be tolerated. In the same fashion, a deterministic phase mask—a mask with prescribed pixel-to-pixel order, may be used e.g., to maximize diffraction efficiency of the hologram or optical throughput of the system.

EXPERIMENT

The apparatus used to demonstrate RCM was set up as follows. A Coherent Radiation 532 nm doubled Nd:YAG laser was used as the system source. Its output was beamsplit to generate the sources for the object and reference beams. The object beam input was spatially filtered, (to produce a plane wave), and directed into a transmissive liquid crystal spatial light modulator. (The modulator is encoded with the information to be recorded.) The encoded signal beam is fourier transformed using a 110 mm Haselblad lens into the recording media. The reference input is also spatially filtered, (producing a phase ordered beam) and directed through a phase mask which is comprised of 1000×1000 array of pixel 10 $\mu$m square pixels, each randomly etched to produce a 0 or $\pi$ phase shift of the input producing a phase beam. This phase beam is imaged onto the recording media using a simple 4f system. The phase mask in addition is mounted on a Newport Research computer controlled motorized actuator allowing rotation of the mask with 0.001 deg resolution. (The two beams cross and are overlapped within the volume of the media.) Holograms were recorded at 1 deg phase mask rotation intervals. The reconstructed holograms are inverse fourier transformed using a 100 mm Haselblad lens and imaged onto a CD camera.

Various modifications to the preferred embodiment can be made without departing from spirit and scope of the invention. For instance, the medium format may be a rectangular card, and rectilinear movement of the optics may be required to steer the phase beam to shine on a given location of the card medium so that phase rotation correlation multiplexing can be used to access individual holograms associated with that given location. Thus, the foregoing description is not intended to limit the invention which is described in the appended claims.

What is claimed is:

1. A holographic process in which an array of overlapping holograms is recorded in a recording medium, holograms being produced by interference of a reference beam and a signal beam, in which the reference beam is a phase beam which consists essentially of a multitude of rays of varying angle of incidence and non-uniform phase, in which the process comprises changing the orientation of the phase beam for recording different holograms, wherein the orientation of phase beam is changed while maintaining the medium stationary in order to enable recording of individual holograms at different orientations.

2. The process of claim 1 wherein changing the orientation involves rotating a phase mask about an axis of a phase-ordered beam incident upon such phase mask.

3. The process of claim 1 wherein changing the orientation involves changing an input angle of a phase ordered beam into a phase mask.

4. The process of claim 1 wherein changing the orientation involves changing the tilt of a phase mask about an axis traversing an axis of a phase-ordered beam incident upon such phase mask.

5. The process of claim 1 wherein changing the orientation involves passing a phase-ordered beam through a lens to a phase mask while changing the tilt of the lens.

6. The process of claim 1 wherein changing the orientation involves passing the phase beam through a lens to the recording medium while changing the tilt of the lens.

7. The process of claim 1 wherein the phase beam includes correlated phase content, and wherein changing the orientation involves rotating a phase mask about an axis of a phase-ordered beam incident upon such phase mask.

8. The process of claim 1 wherein a fixed distance is maintained between a phase mask and the medium while the phase mask orientation is changed to enable recording of individual holograms at different orientations.

9. A holographic process comprising reconstruction of individual holograms contained in an array of overlapping individual holograms recorded in a medium, the process comprising illumination with a reference beam, in which the reference beam is a phase beam which consists essentially of a multitude of rays of varying angle of incidence and non-uniform phase, in which the process comprises changing the orientation of the phase beam for reconstructing different holograms, wherein the orientation of the phase beam is changed while maintaining the medium stationary in order to enable reconstruction of individual holograms recorded at different orientations.

10. The process of claim 9 wherein changing the orientation involves rotating a phase mask about an axis of a phase-ordered beam incident upon such phase mask.

11. The process of claim 9 wherein changing the orientation involves changing an input angle of a phase ordered beam into a phase mask.

12. The process of claim 9 wherein changing the orientation involves changing the tilt of the phase mask about an axis traversing an axis of a phase-ordered beam incident upon such phase mask.

13. The process of claim 9 wherein changing the orientation involves passing a phase-ordered beam through a lens to a phase mask while changing the tilt of the lens.

14. The process of claim 9 wherein changing the orientation involves passing the phase beam through a lens to the recording medium while changing the tilt of the lens.

15. The process of claim 9 wherein the phase beam includes correlated phase content, and wherein changing the orientation involves rotating a phase mask about an axis of a phase-ordered beam incident upon such phase mask.

16. The process of claim 9 wherein a fixed distance is maintained between the phase mask and the medium while the phase mask position is changed to enable reconstruction of individual holograms recorded at different orientations.

17. Article including a holographic array of completely overlapping holograms comprising a medium containing signal information and selection information for uniquely reconstructing an individual hologram in a stack of completely overlapping holograms, wherein the selection information takes the form of multiple angularly separated instances of a phase beam pattern, the pattern having a position-to-position self-similarity such that its auto-correlation function has a value which is sufficiently small that angularly separated instances of the phase beam pattern enable selection of the individual holograms.

18. Article of claim 17 in which the phase beam is of a pattern which corresponds with a phase mask.

19. Article of claim 17 in which the medium is substantially planar.

20. Article of claim 17 in which the medium is of a thickness of less than 1 mm.

21. An article of manufacture encoded in accordance with the process of claim 1.

22. A holographic process in which an array of overlapping hologram stacks is recorded in a recording medium, holograms being produced by interference of a reference beam and a signal beam, in which the reference beam is a phase beam which consists essentially of a multitude of rays of varying angle of incidence and non-uniform phase, in which the process comprises:

changing the orientation of the phase beam for recording different holograms of a first stack of completely overlapping holograms, wherein the orientation of the phase beam is changed while maintaining the medium stationary in order to enable recording of individual holograms at different orientations in the first stack;

after recording multiple holograms in the first stack, shifting the relative position of the medium and the phase beam by a shift amount; and changing the orientation of the phase beam for recording different holograms of a second stack of completely overlapping holograms, wherein the orientation of the phase beam is changed while maintaining the medium stationary in order to enable recording of individual holograms at different orientations in the second stack;

wherein the shift amount is short enough so that the first stack partially overlaps the second stack.

23. The process of claim 22 further including:

after recording multiple holograms of the second stack, shifting the relative position of the medium and the phase beam by the shift amount; and changing the orientation of the phase beam for recording different holograms of a third stack of completely overlapping holograms, wherein the orientation of the phase beam is changed while maintaining the medium stationary in order to enable recording of individual holograms at different orientations in the third stack.

24. An article of manufacture encoded according to the process of claim 22 or 23.

25. A holographic process comprising reconstruction of individual holograms contained in an array of overlapping stacks of individual holograms recorded in a medium, the process comprising illumination with a reference beam, in which the reference beam is a phase beam which consists essentially of a multitude of rays of varying angle of incidence and non-uniform phase, in which the process comprises:

- changing the orientation of the phase beam for reconstructing different holograms from a first stack of completely overlapping holograms, wherein the orientation of the phase beam is changed while maintaining the medium stationary in order to enable reconstruction of individual holograms recorded at different orientations in the first stack; and
- after reconstructing at least one hologram of the first stack, shifting the relative position of the medium and the phase beam by a shift amount; and
- changing the orientation of the phase beam for reconstructing different holograms from a second stack of completely overlapping holograms, wherein the orientation of the phase beam is changed while maintaining the medium stationary in order to enable reconstruction of individual holograms recorded at different orientations in the second stack;
- wherein the shift amount is short enough so that the first stack partially overlaps the second stack.

26. The process of claim 25 further including:

- after reconstructing at least one hologram from the second stack, shifting the relative position of the medium and the phase beam by the shift amount; and
- changing the orientation of the phase beam for reconstructing different holograms from a third stack of completely overlapping holograms, wherein the orientation of the phase beam is changed while maintaining the medium stationary in order to enable reconstruction of individual holograms recorded at different orientations in the third stack;
- wherein the shift amount is short enough so that the second stack partially overlaps the third stack.

* * * * *